(12) United States Patent
Guler et al.

(10) Patent No.: US 7,974,910 B2
(45) Date of Patent: Jul. 5, 2011

(54) ANALYZING AUCTION DATA HAVING A VARYING NUMBER OF BIDDERS

(75) Inventors: Kemal Guler, Cupertino, CA (US); Hsiu-Khuern Tang, Menlo Park, CA (US); Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2381 days.

(21) Appl. No.: 10/694,589

(22) Filed: Oct. 27, 2003

(65) Prior Publication Data

US 2005/0091141 A1  Apr. 28, 2005

(51) Int. Cl.
*G06Q 40/00* (2006.01)

(52) U.S. Cl. .............................. 705/37; 705/7

(58) Field of Classification Search ............. 705/37
See application file for complete search history.

(56) References Cited

U.S. PATENT DOCUMENTS

| | | | |
|---|---|---|---|
| 6,021,398 A * | 2/2000 | Ausubel ..................... | 705/37 |
| 2002/0042765 A1 * | 4/2002 | Dawson ..................... | 705/37 |
| 2002/0046157 A1 | 4/2002 | Solomon | |
| 2002/0069134 A1 | 6/2002 | Solomon | |
| 2002/0082969 A1 | 6/2002 | O'Keeffe et al. | |
| 2002/0116315 A1 | 8/2002 | Grey et al. | |
| 2002/0120552 A1 | 8/2002 | Grey et al. | |
| 2002/0147045 A1 | 10/2002 | La Mura et al. | |
| 2002/0174052 A1 | 11/2002 | Guler et al. | |
| 2003/0014349 A1 | 1/2003 | Guler et al. | |
| 2003/0018515 A1 | 1/2003 | Guler et al. | |
| 2003/0018562 A1 | 1/2003 | Guler et al. | |
| 2003/0041001 A1 | 2/2003 | Hoffman et al. | |
| 2003/0041007 A1 | 2/2003 | Grey et al. | |
| 2003/0041008 A1 | 2/2003 | Grey et al. | |
| 2003/0041009 A1 | 2/2003 | Grey et al. | |
| 2003/0041011 A1 | 2/2003 | Grey et al. | |
| 2003/0041013 A1 | 2/2003 | Grey et al. | |
| 2003/0041014 A1 | 2/2003 | Grey et al. | |
| 2003/0055773 A1 | 3/2003 | Guler et al. | |
| 2003/0069825 A1 | 4/2003 | Hoffman et al. | |
| 2003/0093357 A1 | 5/2003 | Guler et al. | |
| 2004/0103013 A1 * | 5/2004 | Jameson ..................... | 705/7 |

OTHER PUBLICATIONS

Gallien, Jeremie, Ph.D.; Optimization-based auctions and stochastic assembly replenishment policies for industrial procurement; 2000; Massachusetts Institute of Technology; AAT 0801723.*
Blackwell, Gerry, CIO Canada; Turned on to reverse auctions; Aug. 2001; Downsview; ; vol. 9, Iss. 8; p. 18.*
PR Newswire, New York; The Bond Market Association Proposes Rule Changes to Help Speed the Calculation and Announcement of Treasury Auction Results; Mar. 14, 2002; p. 1.*
Paul R. Milgrow et al., "A Theory of Auctions and Competitive Bidding," Econometrica, vol. 50, No. 5, Sep. 1982, pp. 1089-1123.
Emmanuel Guerre et al., "Optimal Nonparametric Estimation of First-Price Auctions," Econometrica, vol. 68, No. 3, May 2000, pp. 525-574.

* cited by examiner

*Primary Examiner* — Harish T Dass
*Assistant Examiner* — Michael D Cranford

(57) ABSTRACT

Methods and associated apparatus comprise, among other features, organizing previously acquired auction data into a plurality of sub-samples, each sub-sample comprising bid data associated with auctions having a common number of bidders, applying an inverse bid function to at least two sub-samples, pooling results from applying the inverse bid function to form a first pool, applying a direct bid function on the first pool to generate sample bids, matching bids from at least one sub-sample to the sample bids, and pooling results from the matching with the first pool to form a second pool.

19 Claims, 3 Drawing Sheets

ANALYZING AUCTION DATA HAVING A VARYING NUMBER OF BIDDERS

BACKGROUND

Auctions are becoming an integral part of a company's strategy for procurement and excess disposal. Auctions can produce substantial cost savings by lowering transaction and negotiation costs and reducing uncertainty. To remain competitive in this arena, it is desirable to make optimal auction decisions. These decisions may include a seller setting the optimal reserve price and a bidder estimating the characteristics of his competitors. Some or all auction decisions may be based on the joint distribution of values for various bidders. With this characterization of the auction market, structural variables can be estimated and bidder behavior can be forecast. Improved techniques for estimating the joint distribution of bidder values are desirable.

BRIEF SUMMARY

In at least some embodiments, a method and associated apparatus comprise organizing previously acquired auction data into a plurality of sub-samples, each sub-sample comprising bid data associated with auctions having a common number of bidders, applying an inverse bid function to at least two sub-samples, pooling results from applying the inverse bid function to form a first pool, applying a direct bid function on the first pool to generate sample bids, matching bids from at least one sub-sample to the sample bids, and pooling results from the matching with the first pool to form a second pool.

BRIEF DESCRIPTION OF THE DRAWINGS

For a detailed description of the embodiments of the invention, reference will now be made to the accompanying drawings in which:

FIG. 4 shows a system configured to implement a plurality of the techniques described herein.

NOTATION AND NOMENCLATURE

Figure 1:
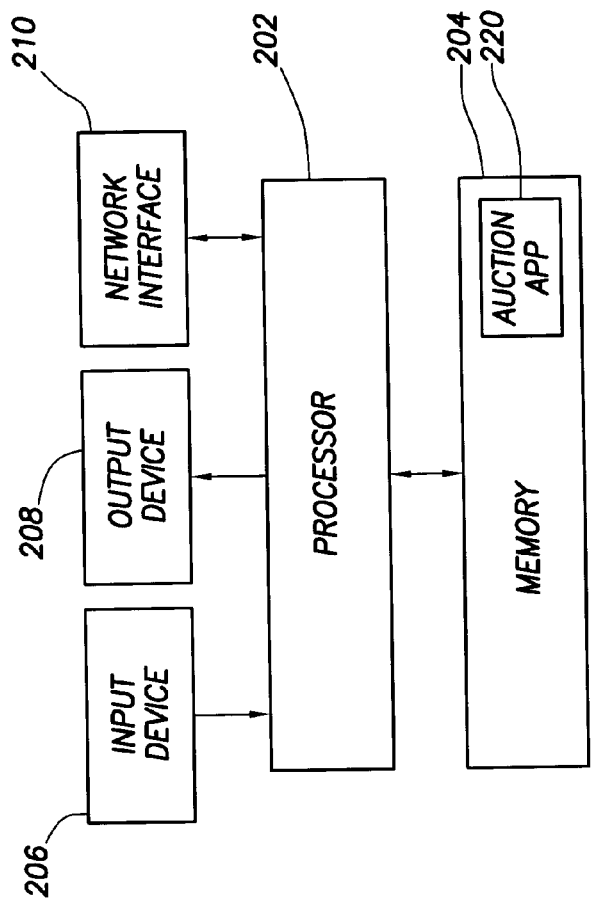
FIG. 1 shows an exemplary embodiment of a historical auction data set.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In accordance with the embodiments of the invention, an analytical process is provided herein that analyzes historical bid data (i.e., bid data from previous auctions) and processes such bid data to generate an estimated distribution of bid values for a given auction. In general, the process described herein comprises a fully non-parametric, analytical approach that makes use of previously acquired auction data sets. Each data set may comprise bid data that pertains to one or more previously occurring auctions and auctions that may have a disparate number of bidders.

The following explanation provides various equations and/or formulae that may be used in accordance with the techniques discussed herein. By way of definition, for a given set of structural variables, a direct bid function represents the optimal bid corresponding to all values of a specified value distribution, $F(v_1, v_2, \ldots v_n)$ where v represents a value for a particular bidder and n is the number of bidders. For ease of explanation, the number of bidders (n) represents the sole structural variable associated with the auction. In addition, the bid function may be considered to be identical for all bidders and is given by:

$$b_i = s(v_i, F, n) \quad (1)$$

where i is an index that specifies the bidder.

While the direct bid function expresses the bid submitted by a bidder as a function of the bidder's valuation, the distribution of bidder valuations and the number of bidders in the auction, an inverse bid function, as represented below, expresses a bidder's valuation as a function of the bid he or she submits, the distribution of posted bids, $G(b_1, b_2, \ldots b_n)$, and the number of bidders in the auction:

$$v_i = s^{-1}(b_i, G, n) \quad (2)$$

Both functions b and v above can be derived from the bidder's optimization problem.

The probability of setting the winning bid is a function of the bid distribution. Under equilibrium, however, the probability of setting the winning bid is equal to the probability of drawing the highest value. Therefore, the probability can be rewritten in terms of the distribution of bidder values as well. The embodiments provided herein are provided for two cases. In the Independent Private Values ("IPV") case, all bidders have independent and identical marginal value distributions. In the Affiliated Private Values ("APV") case, the bidders' valuations are allowed to be statistically correlated.

As noted above, in the IPV case bidders have independent and identical marginal value distributions. The form of the direct bid function for the IPV case may take the following form:

$$b_i = s(v_i, F, n) = v_i - \frac{1}{[F(v_i)]^{n-1}} \int_{\underline{v}}^{v_i} [F(u)]^{n-1} du \quad (3)$$

In the IPV case, the following formulation of the inverse bid function is applicable:

$$v_i = b_i + \frac{1}{n-1} \frac{G(b_i, n)}{g(b_i, n)} \quad (4)$$

where G(b) is the bid distribution function and g(b) is the density function.

The inverse-bid-function formulation expresses the unknown valuation of a bidder in terms of observable variables. The bid distribution function, G(b,n), and density function, g(b,n), can be estimated non-parametrically from a set of observed bids from a historical data set using equations (5) and (6) below:

$$G(b, n) = \frac{1}{nL} \sum_{l=1}^{L} \sum_{i=1}^{n} 1(b_{il} \leq b) \quad (5)$$

$$g(b, n) = \frac{1}{nLh_g} \sum_{l=1}^{L} \sum_{i=1}^{n} K\left(\frac{b - b_{il}}{h_g}\right) \quad (6)$$

In equations (5) and (6), L represents the number of auctions in the data set and n represents the number of bidders. In equation (10), the value $h_g$ represents the "bandwidth" parameter that is also referred to as a "smoothing" or "regularization" parameter. The parameter $h_g$ controls the level of smoothness of the resulting density estimate. Further, the function K may be any suitable kernel function.

Not all auction markets necessarily conform to the IPV assumption. In such cases, the APV model may provide more useful recommendations regarding the structure of the auction. In the APV model the joint value distribution is not simplified because the marginal distributions are correlated. As a result, the conditional value distribution is the main determinant of the bidding decision. Under equilibrium, the probability of setting the winning bid is given by $F_{y_1|v_1}(v_i|v_i)$ where $y_i = \max_{j \neq i} v_j$.

The APV direct bid function is expressed as:

$$b_i = v_i - \int_{\underline{v}}^{v_i} L(\alpha \mid v_i) d\alpha, \quad (7)$$

$$\text{with } L(\alpha \mid v_i) = \exp\left[-\int_{\alpha}^{v_i} \frac{f_{y_1|v_1}(u \mid u)}{F_{y_1|v_1}(u \mid u)} du\right]$$

The inverse bid function for the APV case may be obtained by setting $G_{B_1|b_1}(b_i|b_i) = F_{y_1|v_1}(s^{-1}(b_i)|s^{-1}(b_i))$ and $B_1 = s(y_1)$ to obtain:

$$v_i = b_i + \frac{G_{B_1|b_1}(b_i \mid b_i)}{g_{B_1|b_1}(b_i \mid b_i)} \quad (8)$$

For the inverse bid function, the expressions $G_{B_1|b_1}(b_i|b_i)$ and $g_{B_1|b_1}(b_i|b_i)$ can be estimated using the following joint analog:

$$G_{B_1,b_1}(B \mid b) = \frac{1}{Lh_G} \sum_{l=1}^{L} \frac{1}{n} \sum_{i=1}^{n} 1(B_{il} \leq B) K_G\left(\frac{b - b_{il}}{h_G}\right) \quad (9)$$

$$g_{B_1,b_1}(B \mid b) = \frac{1}{Lh_G^2} \sum_{l=1}^{L} \frac{1}{n} \sum_{i=1}^{n} K_8\left(\frac{B - B_{il}}{h_g}, \frac{b - b_{il}}{h_G}\right) \quad (10)$$

The formulas of (9) and (10) also may be used to calculate $f_{y_1|v_1}(u|u)/F_{y_1|v_1}(u|u)$ in the direct bid function (7). To estimate the conditional distribution and density, the joint formulas (9) and (10) provided above are divided by the probability of observing the conditioning factor. That is:

$$g_{b_1}(b) = \frac{1}{nLh_g} \sum_{l=1}^{L} \sum_{i=1}^{n} K_g\left(\frac{b - b_{il}}{h_g}\right) \quad (11)$$

The techniques described herein process data that has been acquired regarding previously occurring auctions. Exemplary embodiments of the invention permit auction data sets that include auctions having a disparate number of bidders to be processed. FIG. 1 illustrates an exemplary format of an auction data set 50. In general, each row 52 in data set 50 corresponds to an auction participant's bid for a given auction. The auction is identified by an Auction identifier ("ID") 54 and the bidder is identified by a Bidder ID 56. The Auction ID and Bidder ID values 54, 56 can be any alphanumeric identifying value that uniquely identifies the auction and bidder. The bid entered by the bidder is provided in column 58 labeled "Bid." One or more auction rules 60 may be provided that define the characteristics of the auction. Exemplary rules 60 may include any of a variety of rules such as the number of bidders permitted in the corresponding auction and the reserve price.

Figure 2:
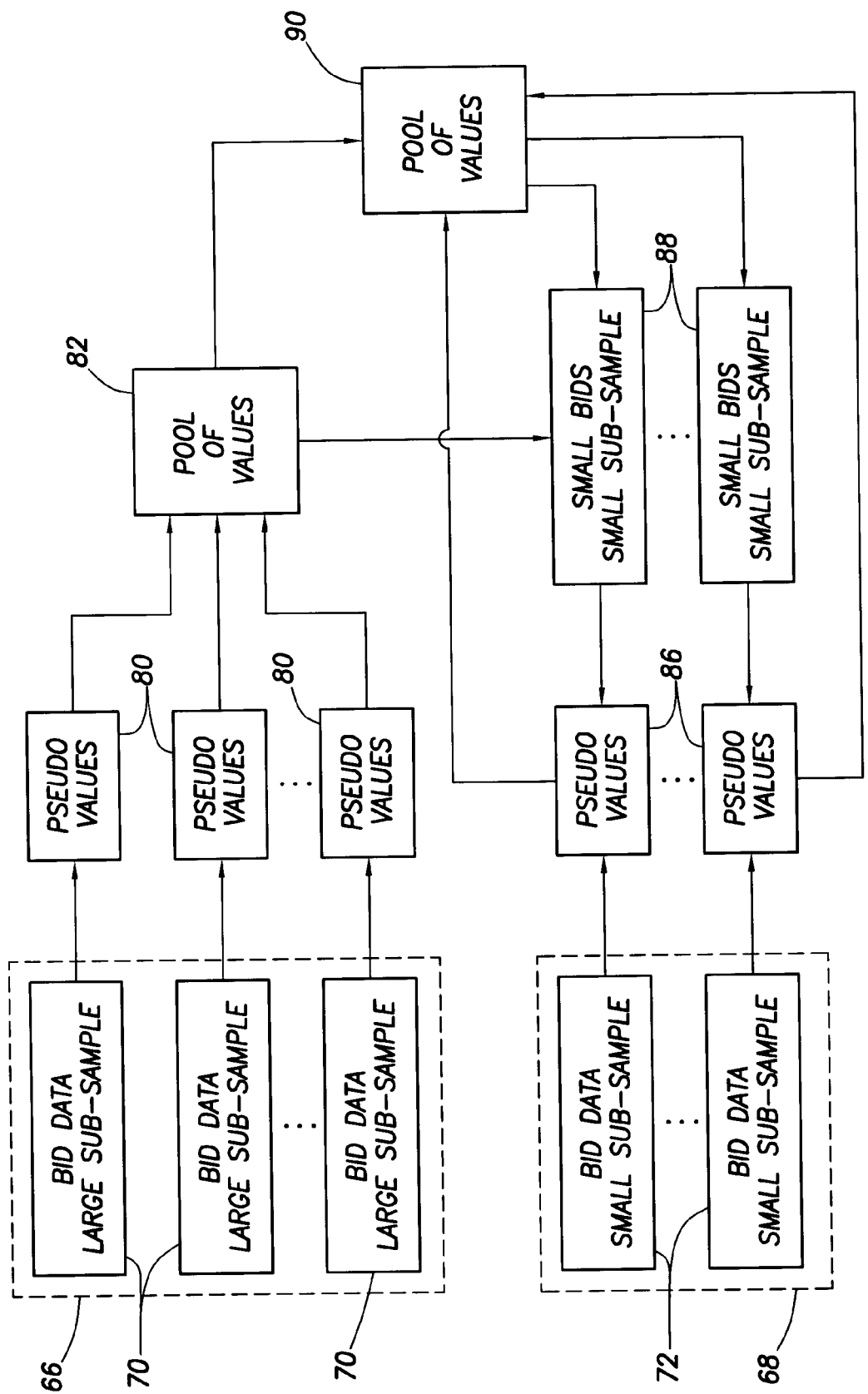
FIG. 2 depicts an exemplary technique in which sub-samples of varying sizes can be used to compute a distribution of estimated bidder values.

FIG. 2 illustrates an embodiment of the invention in which historical auction data is processed and used to generate an estimated distribution of values. An input data set may comprise bid data of multiple auctions with multiple bidders in each auction. In the embodiment of FIG. 2, the data set is divided into groups of sub-samples (i.e., sub-sets). A first group 66 of sub-samples comprises "large" sub-samples 70 while a second group 68 of sub-samples comprises "small" sub-samples 72. Each group 66, 68 may comprise any number of sub-samples 70, 72. Each sub-sample 70, 72 comprises historical auction data of one or more auctions having the same number of bidders. That is, the difference between sub-samples 70 in the first group 66 and the sub-samples 72 in the second group 68 is that each sub-sample comprises auction data having a different number of bidders than for other sub-samples. The large sub-samples 70 may be differentiated from the small sub-samples 72 in that the large sub-samples 70 pertain to auctions having a sufficiently large number of bidders to make reliable use of the auction data. In general, a large sub-sample contains bid data associated with auctions that have more than a pre-specified number of bid observations. The small sub-samples 72 generally pertain to auctions having so few bidders that, without the techniques described herein, use of such data generally would be unreliable. In general, a small sub-sample contains bid data associated with auctions that have less than the pre-specified number of bid auctions. A sub-sample associated with an auction having the pre-specified number of bidders can be classified as large or small as desired. The pre-specified number of bid observations is application specific and thus the differentiation between "large" and "small" sub-samples is application specific.

By application of equation (4) above, for the IPV case for each bidder, denoted by the index i, in each of the large sub-samples 70, a "pseudo-value" 80 can be computed. The pseudo-value 80 is indicative of the value that the $i^{th}$ bidder associates with the item being auctioned. The input values to equation (4) include the number of bidders, n, in the sub-sample, the bid distribution function, G(b), from equation (5), the density function, g(b), from equation (6) and the bid price for the $i^{th}$ bidder.

Once the bid distribution and density functions from equations (5) and (6) are evaluated, the resulting G(b) and g(b) values are included in equation (4) to compute a pseudo-value 80 for the ith bidder. In the IPV case, the resulting pseudo-values 80 can be aggregated, pooled, or otherwise combined together at 82. Although the data from the small sub-samples 72 generally is not used directly in non-parametric estimation, estimates for the small sub-samples 72 are computed by using the pseudo-values 80 from the large sub-samples 70. Using the IPV direct bid function from equation (3) and the large sample estimates, sample bids 88 are computed for a given small sub-sample 72. Pseudo-values 86 for the sample then are computed by matching or comparing the observed bids 72 to the sample bids 88. The new pseudo-values 86 are also added to the pool of values 82 to form a pool of values 90 from which a value distribution can be computed.

Referring still to FIG. 2, in the APV case the large sample pseudo-values are not pooled together. Instead, the pseudo-values 80 from each large sub-sample 70 may be re-sampled separately to create all combinations of value data conforming to the number of bidders in a given small sub-sample. The re-sampled data is used to calculate sample bids for the small samples 72. Matching extracts value estimates. Use of the APV direct bid function of equation (7) permits the small sub-samples to be incorporated into the estimation, and captures a portion of the shared information between large sub-samples 70 and small sub-samples 72.

Figure 3:
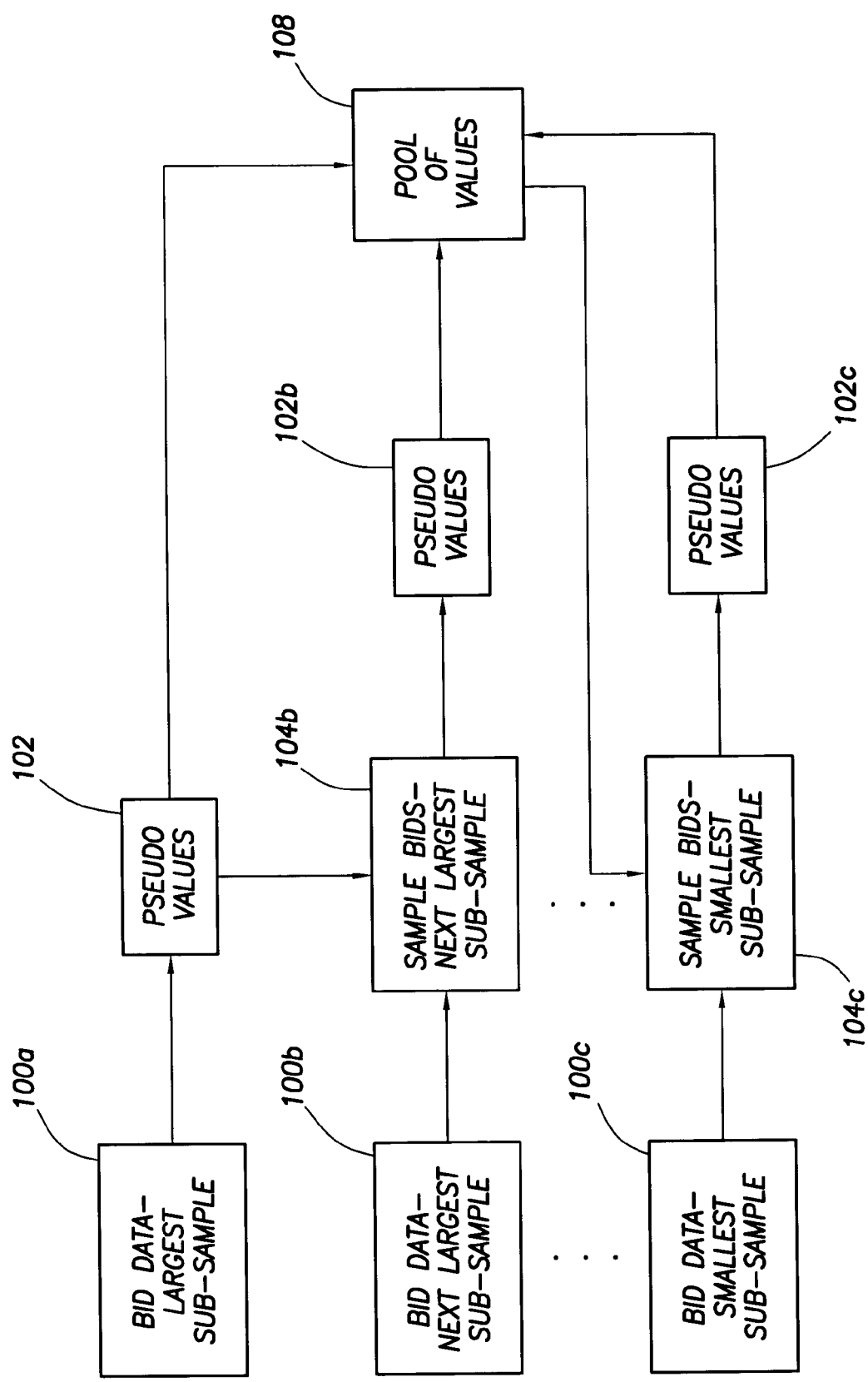
FIG. 3 depicts an alternative technique to that of FIG. 2.

FIG. 3 illustrates a technique in which the historical data set is apportioned into one or more sub-samples 100a-100c. Each sub-sample includes bid data pertaining to auctions having the same number of bidders. Sub-sample 100a includes bid data of the auctions having the largest number of bidders. Sub-sample 100b includes bid data of auctions with the next largest number of bidders. Additional sub-samples may be included as well pertaining to auctions with increasingly smaller numbers of bidders. Sub-sample 100c includes bid data of auctions having the fewest number of bidders. Beginning with the largest sub-sample (100a), the technique of FIG. 3 applies the APV inverse bid function of (8) to sub-sample 100a to produce initial pseudo-values 102 which are added to the pool 108. The technique then uses the initial pseudo-samples 102 in the APV direction bid function of (7) to calculate a set of sample bids 104b that correspond to the next largest sub-sample (100b). The pseudo values 102b associated with sub-sample 100b are obtained by matching the observed bids to the sample bids and are added to pool 108. The newly expanded pool 108 then is used to calculate pseudo-values for the next largest sub-sample and the process continues through the smallest sub-sample 100c.

At the end of the estimation, the pool of values 108 contains data from each sub-sample and captures correlation(s) between the sub-samples. Sharing information among sub-samples may improve the estimation. If there is a gain to be achieved from information sharing, the process may iterate back to the largest sub-sample 100a and may repeat the process one or more times until the resulting value estimates fail to improve.

Looping back through the data set may be difficult in the APV case because sampling may rely on the pooled data being of higher dimension than the sub-sample in question. Several refinements, however, can be made to address this issue. In one embodiment, parametric representation of correlation may be used and the relevant parameters can be estimated using the largest subsample.

FIG. 4 illustrates an exemplary embodiment of a system 200 that implements the techniques described herein. As shown, the system 200 may include a processor 202 coupled to a memory 204, an input device 206, an output device 208 and a network interface 210. The memory 204 may comprise volatile memory and/or non-volatile memory and contain an auction application 220 that is executed by processor 202. Auction application 220 performs some or all of the actions described above. The input device 206 may comprise a keyboard, mouse, or other suitable type of input device. The output device 208 may comprise a display. The network interface 210 provides the system 200 with connectivity to a network. The historical auction data sets processed by the auction application 220 may be stored in memory 204 or on the network and provided to the system 200 via the network interface 210.

The technique disclosed herein by which the direct and inverse bid functions iteratively use all available data is applicable in other situations where the subsamples may be formed on the basis of variables other than the number of bidders in the auction. Variation in factors (such as the reserve price) create similar problems for data analysis. If the available data contains auctions with different reserve prices, then one can modify the disclosed technique by replacing the number of bidders with a reserve price as the basis of forming sub-samples.

The above discussion is meant to be illustrative of the principles and various embodiments of the present invention. Numerous variations and modifications will become apparent to those skilled in the art once the above disclosure is fully appreciated. The following claims embrace all such variations and modifications.

What is claimed is:

1. A method of analyzing auction data, comprising:
organizing, by a processor, previously acquired auction data into a plurality of sub-samples, each sub-sample comprising bid data associated with auctions having a common number of bidders, the number of bidders varying among the sub-samples;
applying, by the processor, an inverse bid function to at least two sub-samples;
pooling, by the processor, results from applying the inverse bid function to form a first pool;
applying, by the processor, a direct bid function on the first pool to generate sample bids;
matching, by the processor, bids from at least one sub-sample to the sample bids; and
pooling, by the processor, results from the matching with the first pool to form a second pool.

2. The method of claim 1 wherein applying the inverse bid function comprises applying a function that is applicable to an independent private values ("IPV") auction.

3. The method of claim 1 wherein applying the direct bid function comprises applying a function that is applicable to an independent private values ("IPV") auction.

4. The method of claim 1 wherein organizing comprises forming a first group of large sub-samples and a second group of small sub-samples, the small sub-samples containing bid data associated with auctions that have fewer than a pre-specified total number of bid observations and the large subsamples containing bid data associated with auctions that have more than a pre-specified total number of bid observations.

5. A method, comprising:
organizing, by a processor, previously acquired auction data into a plurality of sub-samples, each sub-sample comprising bid data associated with auctions having a common number of bidders, a first sub-sample comprising bid data associated with auctions having more bidders than all other sub-samples;
applying, by the processor, an inverse bid function to the largest sub-sample to produce initial pseudo values;
applying, by the processor, a direct bid function to the initial pseudo values to calculate sample bids associated with a second sub-sample that is the next largest sub-sample, in terms of number of bidders, after the first sub-sample;
matching, by the processor, bid data contained in the second sub-sample with the sample bids to produce second pseudo values; and
combining, by the processor, the first and second pseudo values together to produce combined auction values.

6. The method of claim 5 further comprising applying the direct bid function to the combined auction values to calculate additional sample bids associated with a third sub-sample that is the next largest sub-sample after the second sub-sample, in terms of number of bidders.

7. The method of claim 6 further comprising matching the additional sample bids with the third sub-sample to produce third pseudo values and combining the third pseudo values into the combined auction values.

8. The method of claim 7 further comprising applying the direct bid function to calculate additional sample bids associated with additional sub-samples of decreasing size, in terms of the number of bidders, matching the sample bids to the additional sub-samples to produce additional pseudo values, combining the additional pseudo values into the combined auction values.

9. A system, comprising:
a processor;
memory containing an auction application that is executed by the processor and causes the processor to
form a plurality of sub-samples from an auction data set, each sub-sample comprising bid data associated with auctions having a common number of bidders;
apply an inverse bid function to at least two sub-samples;
aggregate results from applying the inverse bid function to form a first pool;
apply a direct bid function on the first pool to generate sample bids;
match bids from at least one sub-sample to the sample bids; and
aggregate results from the matching with the first pool to form a second pool.

10. The system of claim 9 wherein the inverse bid function comprises a function that is applicable to an independent private values ("IPV") auction.

11. The system of claim 9 wherein the direct bid function comprises a function that is applicable to an independent private values ("IPV") auction.

12. A system, comprising:
a processor;
an application executable by said processor and that causes the processor to
organize previously acquired auction data into a plurality of sub-samples, each sub-sample comprising bid data associated with auctions having a common number of bidders;
apply an inverse bid function to at least two sub-samples;
re-sample results from applying the inverse bid function to generate re-sampled data;
apply a direct bid function on the sampled data to generate sample bids; and
match bids from at least one sub-sample to the sample bids.

13. The system of claim 12 wherein the inverse and direct bid functions comprise functions that are applicable to an independent private values ("IPV") auction.

14. A computer readable storage medium storing instructions that when executed by a processor cause the processor to process auction data, said instructions comprising:
at least one instruction that organizes previously acquired auction data into a plurality of sub-samples, each sub-sample comprising bid data associated with auctions having a common number of bidders;
at least one instruction that applies a first bid function to at least two sub-samples;
at least one instruction that re-samples results from applying the first bid function to generate re-sampled data;
at least one instruction that applies a second bid function on the sampled data to generate sample bids; and
at least one instruction that matches bids from at least one sub-sample to the sample bids.

15. The storage medium of claim 14 wherein the first bid function comprises an inverse bid function.

16. The storage medium of claim 14 wherein the second function comprises a direct bid function.

17. A computer readable storage medium storing instructions that when executed by a processor cause the processor to process auction data, said instructions comprising:
at least one instruction that forms previously acquired auction data into a plurality of sub-samples, each sub-sample comprising auction data associated with auctions having a common number of bidders, a first sub-sample comprising bid data associated with auctions having more bidders than all other sub-samples;
at least one instruction that applies an inverse bid function to the largest sub-sample to produce initial pseudo values;
at least one instruction that applies a direct bid function to the initial pseudo values to calculate sample bids associated with a second sub-sample that is the next largest sub-sample, in terms of number of bidders, after the first sub-sample;
at least one instruction that matches bid data contained in the second sub-sample with the sample bids to produce second pseudo values; and
at least one instruction that combines the first and second pseudo values together to produce combined auction values.

18. The storage medium of claim 17 further comprising an at least one instruction that applies the direct bid function to the combined auction values to calculate additional sample bids.

19. The storage medium of claim 17 further comprising matching the additional sample bids with a sub-sample to produce additional auction values.

* * * * *